June 9, 1953   R. F. MASON   2,641,382
WELDER'S FLUX POT
Filed Jan. 9, 1952
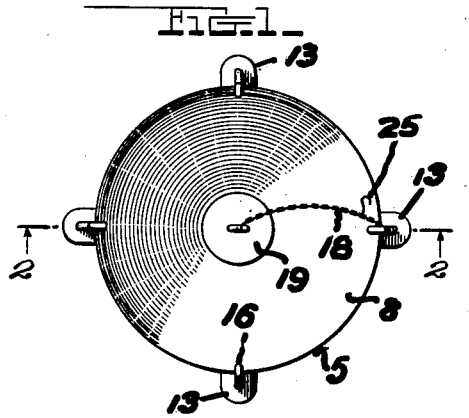
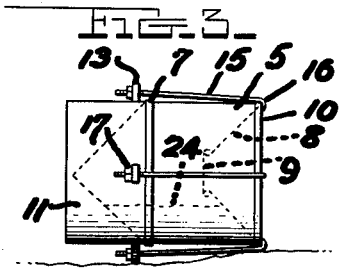
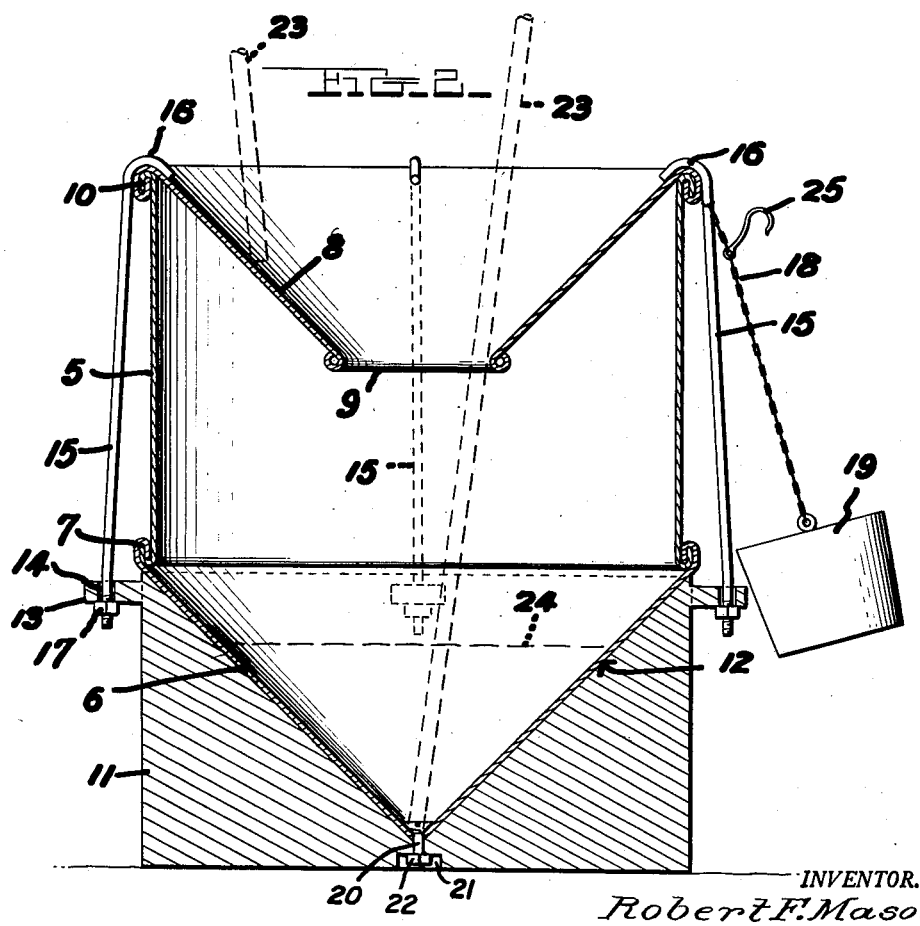
INVENTOR.
Robert F. Mason
BY
atty.

Patented June 9, 1953

2,641,382

UNITED STATES PATENT OFFICE 2,641,382

WELDER'S FLUX POT

Robert Flay Mason, Magee, Miss.

Application January 9, 1952, Serial No. 265,676

1 Claim. (Cl. 220—69)

This invention is a flux pot for use by welders to contain the welding flux used in well known welding operations.

The flux pots heretofore used have been nothing more than ordinary cans with flat bottom and removable top, and such containers offer several objections. To begin with, it should be remembered that in the welding operation the face of the operator is more or less masked and his view, except of his work, is obscured. In reaching the welding rod for the flux, he frequently must do so without actually seeing the pot, in many instances the pot is upset and the valuable flux is wasted. Again, with the ordinary flux container it frequently happens that the container is not resting upon a level surface, in which event the contents may fall to one side of the container and thus not be contacted by the rod when the operator inserts it in the container. Furthermore, there is nothing present in the currently used flux container to guide the rod as the operator seeks to immerse the lower end thereof in the flux.

The primary object of the present invention is to provide a flux pot of such construction as to overcome the objections stated and to provide a construction which will adequately serve the purposes for which it is designed and which by overcoming the objections noted will work to the advantage of the operator in the saving of time and overcoming the opportunity for waste.

With the foregoing objects in view, together with others which will appear as the description proceeds, the invention consists in the novel construction, combination and arrangement of parts, all as will be described more fully hereinafter, illustrated in the drawings, and particularly pointed out in the claim.

In the drawings:

Fig. 1 is a top plan view of a flux pot constructed in accordance with the present invention, Fig. 2 is an enlarged vertical sectional view taken through the improved flux pot on substantially the line 2—2 of Fig. 1, and Fig. 3 is a side elevation on a reduced scale of the flux pot as illustrated in Figs. 1 and 2 and showing the latter upon its side.

Referring now more particularly to the drawing, 5 indicates the side wall of a flux can embodying my invention, the said wall being shaped in cylindrical form and having a bottom 6 secured to its lower edge as by crimping as at 7. The bottom 6 is of substantially cone-shape with the apex thereof disposed downwardly and located substantially in the longitudinal center of the cylindrical body.

The top for the container is indicated at 8, and also includes downwardly inclined walls so that the said top is of substantially frusto-conical shape with the base disposed uppermost. The walls 8 terminate short of the apex of the top so as to provide an opening 9 whose center is disposed in the longitudinal axis of the can body 5. The walls 6 of the bottom and 8 of the top are disposed in substantial parallelism as shown, and the top 8 may be secured to the upper edges of the cylindrical body by crimping as indicated at 10.

The improved flux pot includes a base 11 formed preferably of metal or some other relatively heavy material of substantially the same transverse diameter as the body 5 and having inclined internal walls 12 converging in a downward direction and meeting in the longitudinal axis of the container 5. The walls 12 coincide with the inclination of the wall 6 of the bottom so that a snug fit is assured between the receptacle bottom and the walls 12 of the base 11. The walls 12 of the base and the coacting walls 6 of the bottom are provided with aligned openings in the apices thereof to receive a securing bolt 20. The bottom 11 will be provided with a recess 21 surrounding the opening and in which the securing nut 22 of the bolt will be seated. By this construction, the flux pot bottom and the weighted base 11 may be rigidly secured together and in such manner that a liquid-tight joint is effected. The bolt securing structure may be relied upon entirely to secure the container and the bottom 11 together, or may be used in conjunction with the securing rods 15 as desired.

The base 11 has projecting outwardly from the sides thereof and near its upper end bosses 13 each having openings 14 extending therethrough to receive the lower ends of connecting rods 15. The rods 15 are provided at their upper ends with inwardly directed hooks 16 to engage over the upper end of the container body 5 and are provided at their lower ends with threads to receive the securing nuts 17. In the present instance, four of these bosses with their locking rods 15 are disclosed, but it will be understood that the number may be increased or diminished as desired.

A chain 18 is secured at one end to one of the rods 15 and has a stopper of suitable material 19 secured at its other end. This stopper is of sufficient diameter to fit snugly within the opening 9 in the top, so that when not in use the stopper 19 will effectively seal the pot against the escape of flux or the admission of foreign matter such as dirt, dust, etc.

From the foregoing, it will be seen that the flux pot is provided with a relatively wide opening or top which has downwardly converging side walls to guide the end of the flux rod indicated at 23 when inserted by an operator. The liquid level of the flux is indicated at 24, and it is apparent that the depth of the flux will be maintained in the conical bottom of the container, thus assuring coating of the lower end of the rod regardless of the angle at which it may be inserted. The inclined walls 6 of the pot bottom will guide the lower end of the rod to its deepest point at the apex of the bottom. By providing the bottom 11 of relatively thick and heavy material, the center of gravity of the pot is decidedly lower so as to minimize the opportunity for accidental upsetting of the pot. The arrangement of the conical bottom and top elements of the container insure against accidental spilling of the flux in the event the pot should be accidentally tilted upon its side or upended. In the tilting position shown in Fig. 3 the liquid level is indicated at 24 below the mouth or opening 9 of the pot.

If desired, an attaching hook 25 may be secured either to the chain 18 or to the pot itself in order that the flux pot may be hung up upon a suitable support either when the pot is in use in elevated positions or when not in use.

I claim:

In a flux pot, a cylindrical body, a top for said body having reentrant downwardly converging side walls, the lower ends of said walls cut away to provide an opening, a bottom for said body having downwardly converging side walls meeting in the longitudinal axis of said body, a base having an opening extending inwardly from one end thereof, the side walls of said opening converging downwardly and with their apex disposed in the longitudinal center of said body, said bottom and said body having aligned openings, a bolt extending through said openings and clampingly maintaining said bottom and said body walls together, lugs projecting outwardly from the sides of said bottom, said lugs having openings therein disposed parallel with the axis of said body, rods extending through said openings, hooks on the upper ends of said rods to engage with the upper edge of said body, nuts threadedly engaged with the lower ends of said rods to clampingly engage with said lugs, and a stopper secured to said body and of a size to snugly fit with the opening in said top.

ROBERT FLAY MASON.

References Cited in the file of this patent

UNITED STATES PATENTS

| Number | Name | Date |
| --- | --- | --- |
| 96,487 | Savery | Nov. 2, 1869 |
| 239,674 | Sands | Apr. 5, 1881 |
| 511,617 | Howard | Dec. 26, 1893 |
| 1,576,348 | Moran | Mar. 9, 1926 |
| 1,910,484 | Thompson | May 23, 1933 |
| 2,067,581 | Smith | Jan. 12, 1937 |

FOREIGN PATENTS

| Number | Country | Date |
| --- | --- | --- |
| 77,122 | Switzerland | Mar. 1, 1918 |